UNITED STATES PATENT OFFICE.

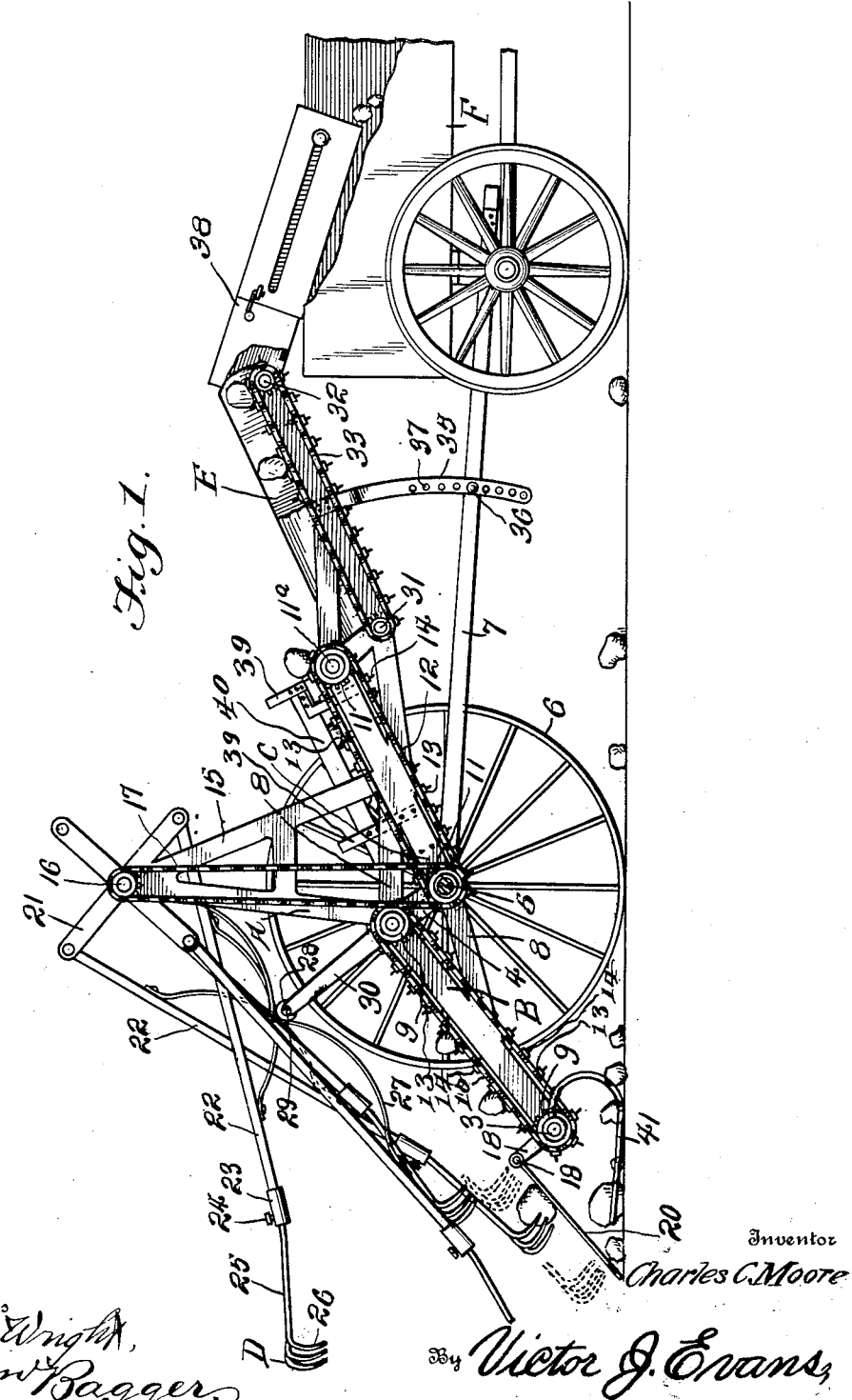

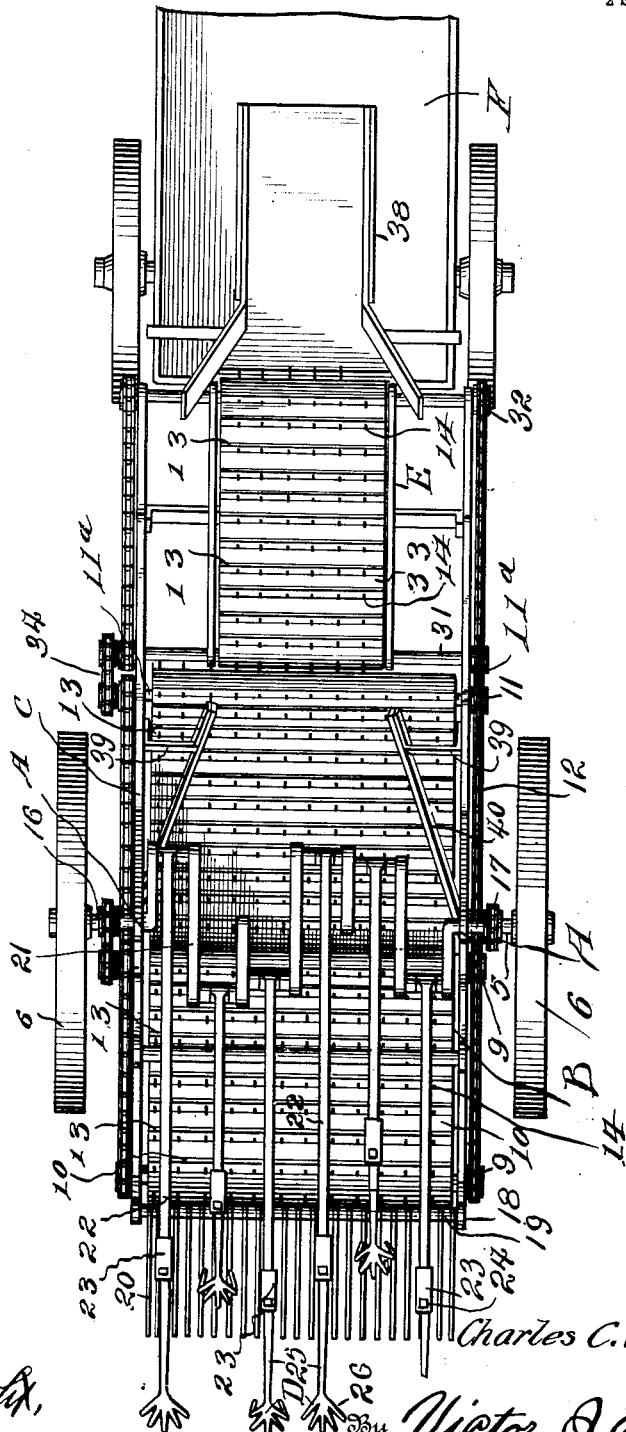

CHARLES C. MOORE, OF CARTHAGE, MISSOURI.

ROCK-GATHERING MACHINE.

965,115.   Specification of Letters Patent.   Patented July 19, 1910.

Application filed September 1, 1909. Serial No. 515,610.

*To all whom it may concern:*

Be it known that I, CHARLES C. MOORE, a citizen of the United States, residing at Carthage, in the county of Jasper and State of Missouri, have invented new and useful Improvements in Rock-Gathering Machines, of which the following is a specification.

This invention relates to machines for gathering rocks and stones from the surface of the soil for the purpose of placing the ground in better condition for cultivation; and it has particular reference to that class of rock gathering machines which are adapted to be connected with a wagon, the box of which will constitute a receptacle wherein the stones and rocks may be delivered by the elevating mechanism which constitutes a portion of the machine.

One object of the invention is to provide a machine of the class described in which the gathering of the stones and rocks will be accomplished by a plurality of reciprocatory arms having terminal gathering devices which will alternately engage the soil, gathering therefrom not only the rocks and stones that may rest upon the surface but also such as may be embedded or partly embedded in the soil near the surface of the latter.

A further object of the invention is to provide an inclined plane over which the rocks and stones may be conveyed to the elevating mechanism, said inclined plane being composed of a plurality of arms or members that are connected hingedly with the elevating mechanism in such a manner that, in case of their becoming entangled with the scrapers, they will be lifted or swung upon their pivots without injury to the parts of the machine.

Further objects of the invention are to simplify and improve the construction and operation of the class of devices to which the invention appertains.

With these and other ends in view which will readily appear as the nature of the invention is better understood the same consists in the improved construction and novel arrangement and combination of parts, which will be hereinafter fully described and particularly pointed out in the claims.

In the drawings has been illustrated a simple and preferred form of the invention; it being however, understood that no limitation is necessarily made to the precise structural details therein exhibited, but that changes, alterations and modifications within the scope of the invention may be resorted to, when desired.

In the drawing: Figure 1 is a sectional elevation of a machine constructed in accordance with the invention. Fig. 2 is a top plan view of the same.

Corresponding parts in the several views are indicated by like characters of reference.

The improved rock gathering machine comprises in its construction an axle 5 supported upon transporting wheels 6 and having a forwardly extending tongue 7. The axle supports an upright A having a rearwardly extending frame B and a forwardly extending frame C, each of said frames being reinforced by braces as will be seen at 8 in Fig. 1 of the drawings.

The rearwardly extending frame B is provided adjacent to the ends thereof with shafts carrying rollers 9 upon which an endless carrier 10 is supported. The frame C is likewise provided with rollers 11 that serve to support an endless carrier 12, one of said rollers being mounted directly upon the axle 5 and the other upon a shaft 11$^a$ which is supported in suitable bearings adjacent to the front end of the frame. The carriers 10 and 12 are each composed of a plurality of suitably connected slats 13 having outwardly extending prongs 14 that will serve to engage the material that is to be conveyed over the elevators and to prevent such material from slipping.

The frame structure of the machine is provided at the sides thereof with upstanding brackets 15 provided adjacent to their upper ends with bearings for a transversely disposed shaft 16 which receives motion from one or both of the transporting wheels 6 through the medium of a flexible element or elements such as chains 17. Motion is transmitted from the shaft 16 to the shaft 9 at the forward end of the elevator 10 which is thus driven. The elevator 12 is driven directly from the axle 5 as will be readily understood.

The frame B which is downwardly and rearwardly inclined as clearly shown in Fig. 1 is provided adjacent to its rear end with uprights 18 connected by a cross bar or rod 19 upon which a plurality of arms 20 are hingedly supported, said arms combining to form an inclined plane over which rocks, stones and other material may be guided onto the carrier 10. The shaft 16 is provided with a plurality of cranks 21 radiating in various directions from said shaft, each of said cranks carrying an arm 22 which is pivotally connected therewith. Each of the arms 22 is provided adjacent to its free end with a sleeve 23 adapted to be secured in any position to which it may be adjusted upon the arm by means of a set screw 24, each of said sleeves being provided with a rearwardly extending stem or bracket 25 having a terminal scraper D composed of a plurality of downwardly extending curved or hook-shaped fingers 26 combining to form a claw which is adapted to engage the soil, to loosen rocks or stones that may be embedded or partly embedded therein as well as those resting upon the surface of the soil, and to convey such rocks or stones over the inclined plane formed by the arms 20 onto the carrier 10. Each of the arms 22 is provided upon its under side with a downwardly curved or arched strap 27 adapted to engage and ride upon a roller 28 supported for rotation upon a shaft 29 that is supported in bearings adjacent to the upper end of brackets 30 rising from the sides of the frame structure of the machine.

An auxiliary frame E is hingedly mounted upon a shaft 31 supported in suitable bearings adjacent to the forward end of the frame C, said frame E being provided adjacent to its forward end with bearings wherein a shaft 32 is supported for rotation. An endless carrier 33, the construction of which resembles that of the carriers 10 and 12 is supported upon the shafts 31—32, the former of which is driven by an endless chain 34 from the shaft 11ª supporting the forward end of the carrier 12. The frame E is provided with a downwardly extending arm or bracket 35 adapted to be adjustably connected with the tongue 7 as by means of a pin 36 engaging the tongue and extending through one of a series of perforations 37 in the arm 35 by means of which the frame E may thus be tilted or adjusted to various positions for the purpose of vertically adjusting the discharge end of said frame. Hingedly connected with the frame E adjacent to the rear end of the latter is a suitably constructed discharge chute 38.

Suitably attached to the side members of the frame C are brackets 39 serving to support forwardly converging guides 40 whereby material passing over the carrier 12 will be directed toward the central portion of said carrier from which it will thus be discharged upon the carrier 33 which is relatively narrow. The use of the guides or deflectors 40 enables the gathering portion of the machine to be made of relatively great width so as to take in a wide space or swath at each operation.

From the foregoing description taken in connection with the drawings hereto annexed the operation and advantages of this invention will be readily understood. The machine may be connected for operation with the rear axle and the reach of an ordinary farm wagon, a portion of which has been shown at F, and whereby the gathering machine will be propelled over the field. Motion is transmitted from the supporting or transporting wheels 6 to the several carriers as well as to the shaft 16 the cranks of which carry the scraper arms 22. The free ends of the latter will be vertically reciprocated by reason of the arched guide members 27 engaging the roller 28 and it will be seen that as the claws or scrapers approach the rear limits of their movements they will descend, thus causing the claws to engage and to enter the surface of the soil. As the claws are propelled upwardly and forwardly, any rocks, stones or other obstruction encountered thereby will be carried over the inclined plane composed of the arms 20 and deposited upon the lower end of the carrier 10. If one or more arms 20 should be engaged by or become entangled with any of the claws or scrapers, it will simply swing in an upward direction until disengaged from the claw by the elevation of the latter resulting from the engagement of the arched strip or guide member 27 with the roller 28, after which the arm or arms 20 will drop by gravity to their initial position. The rocks, stones and other obstructions will be conveyed by the carriers 10, 12 and 33 to the chute 38 over which the material will be discharged into the box of the wagon with which the machine is connected.

Runners, shown at 41, may be used for the purpose of supporting the free or rear end of the frame B. This improved rock gathering machine is simple in construction and easily operated as well as being thoroughly efficient for the purposes for which it is provided.

Having thus described the invention, what is claimed is—

1. In a machine of the character described, a frame structure supported upon an axle, a conveying device supported by said frame, and comprising a plurality of endless carriers, an inclined plane supported adjacent to the rear end of the frame structure and comprising a plurality of independently hinged arms, a crank shaft having a plurality of arms connected with the cranks, claws supported upon the extremities of the arms, arched guide members upon the under sides of the latter, a guide roller supporting the guide members, and means for driving the movable parts of the machine.

2. In a machine of the character described, a conveyer, an inclined plane connected therewith and comprising a plurality of independently hinged arms, and a longitudinally and vertically reciprocatory claws movable over the inclined plane.

3. In a machine of the character described, the combination with reciprocatory gathering members of an inclined plane comprising a plurality of independently hinged arms, and a conveyer with which the inclined plane is connected.

4. In a machine of the character described, a conveyer, an inclined plane connected therewith, a shaft having a plurality of cranks, arms for said cranks, sleeves adjustable upon said arms and having brackets provided with downturned fingers constituting claws, arched guide members upon the under sides of the arms, and a guide roller supported below the arms and engaging the guide members.

In testimony whereof I affix my signature in presence of two witnesses.

CHARLES C. MOORE.

Witnesses:
B. F. HACKNEY,
G. H. KINGSTON.